United States Patent
Dia et al.

(10) Patent No.: US 11,550,020 B2
(45) Date of Patent: Jan. 10, 2023

(54) METHOD AND APPARATUS FOR PERFORMING GRID-BASED LOCAILIZATION OF A MOBILE BODY

(71) Applicant: COMMISSARIAT A L'ENERGIE ATOMIQUE ET AUX ENERGIES ALTERNATIVES, Paris (FR)

(72) Inventors: Roxana Dia, Grenoble (FR); Suzanne Lesecq, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 56 days.

(21) Appl. No.: 17/338,604

(22) Filed: Jun. 3, 2021

(65) Prior Publication Data

US 2021/0396836 A1    Dec. 23, 2021

(30) Foreign Application Priority Data

Jun. 18, 2020  (EP) .................................... 20305664

(51) Int. Cl.
   G01S 5/14      (2006.01)
   G01S 5/02      (2010.01)

(52) U.S. Cl.
   CPC .......... G01S 5/0269 (2020.05); G01S 5/0278 (2013.01); G01S 5/14 (2013.01)

(58) Field of Classification Search
   CPC ......... G01S 5/0269; G01S 5/0278; G01S 5/14
   USPC ........................................................ 342/451
   See application file for complete search history.

(56) References Cited

U.S. PATENT DOCUMENTS

| 10,088,549 B2 * | 10/2018 | Nielsen ................. G01S 19/485 |
| 2014/0129027 A1 | 5/2014 | Schnittman |
| 2019/0385328 A1 * | 12/2019 | Grosse-Kunstleve ....................... G01S 5/163 |

FOREIGN PATENT DOCUMENTS

| CN | 109635674 A * | 4/2019 | |
| EP | 3 594 719 A1 | 1/2020 | |
| EP | 3926434 A1 * | 12/2021 | ........... G01S 5/0269 |
| WO | 2017/050890 A1 | 3/2017 | |

(Continued)

OTHER PUBLICATIONS

Burgard, et al., "Estimating the absolute position of a mobile robot using position probability grids", National Conference on Artificial Intelligence, (1996).

(Continued)

*Primary Examiner* — Harry K Liu
(74) *Attorney, Agent, or Firm* — BakerHostetler (57) ABSTRACT

A method of localizing a mobile body (MB) in a known environment, includes the following steps: a) defining an occupancy grid (G) modeling the environment; b) defining a set of position grids (Π) each position grid being associated to a heading of the mobile body; c) receiving a time series of measurements ($z_1, z_2, \ldots$) from a distance sensor carried by the mobile body; and d) upon receiving a measurement of the time series, updating the pose probabilities of the position grids as a function of present values of the occupancy probabilities and of the received measurement; wherein step d) is carried out by applying an inverse sensor model to the received measurement, while considering the distance sensor co-located with a detected obstacle and by applying Bayesian fusion to update the pose probabilities of the position grids.

10 Claims, 5 Drawing Sheets

(56) References Cited

FOREIGN PATENT DOCUMENTS

WO    WO-2019068175 A1 * 4/2019
WO    2019/244060 A1   12/2019

OTHER PUBLICATIONS

Elfes, "Using occupancy grids for mobile robot perception and navigation", Computer, 22(6): pp. 46-57,(1989).
Dia, et al., "Evaluation of occupancy grid resolution through a novel approach for inverse sensor modeling", IFAC World Congress, pp. 13841-13847, (2017).
Dia, et al., "General inverse sensor model for probabilistic occupancy grid maps using multi-target sensors", Int. Symposium on Mathematical Theory of Networks and Systems, 2018.
Rakotovao, et al., "Multi-sensor fusion of occupancy grids based on integer arithmetic", IEEE Int. Conf. on Robotics and Automation, pp. 1854-1859, (2016).
Kaufman, et al., "Bayesian occupancy grid mapping via an exact inverse sensor model", 2016 American Control Conference (ACC), pp. 5709-5715, 2016.

* cited by examiner

METHOD AND APPARATUS FOR PERFORMING GRID-BASED LOCAILIZATION OF A MOBILE BODY

CROSS-REFERENCE TO RELATED APPLICATIONS

This application claims priority to foreign European patent application No. EP 20305664.3, filed on Jun. 18, 2020, the disclosure of which is incorporated by reference in its entirety.

FIELD OF THE INVENTION

The invention relates to a method for localizing a mobile body, such as a robot, in an at least partially known environment using measurements performed by at least one distance sensor carried by the mobile body itself ("self-localization"). It also relates to an apparatus for carrying out such a method.

BACKGROUND

The invention applies, in particular, to the field of robotics, and more particularly to that of autonomous vehicles, etc. and more generally it pertains to the field of perception.

In the following,

A "known environment" means a region of space surrounding in whole or in part the mobile body, and within at least part of which the mobile body can move, a model—or "map"—of which is available. The environment model may in particular take the form of a grid formed by cells, at least some of which are considered to be occupied by "obstacles" (e.g. walls) which can be detected by a suitable sensor and through which the mobile body cannot pass.

"Localization" refers to the task of determining at least the position, and preferably also the heading, of the mobile body, with respect to the environment.

A distance (or "range") sensor is a sensor that provides information about at least the distance to a nearest obstacle in its field of view. Its physical operating principle is irrelevant: sensors as diverse as LIDARs, radars, sonars, etc., may be used to implement the inventive method and apparatus. Some distance sensors may provide additional information, e.g., the distance of all obstacles in a field of view and in some cases the azimuth/elevation of said obstacles. A distance sensor may be considered to be of the "narrow-angle" or of the "wide-angle" type. A distance sensor is considered to be "wide-angle" when there is a non-negligible likelihood that several different obstacles are simultaneously present inside its field of view, and possibly at a same distance from it (taking into account the finite resolution of the distance measurement). Conversely, a distance sensor is considered to be "narrow-angle" when such likelihood is negligible. Therefore, these definitions are application-dependent. Within the framework of the invention, distance sensors will be considered to have nearest-obstacle behavior (i.e., to only provide information on the range of a nearest obstacle) and a narrow-angle field of view.

A "moving body" is a body that is capable of translating and/or rotating in one, two or three dimensions in the environment. For instance, it may be a robot, drone, autonomous vehicle or the like, or even a device that cannot move autonomously but is carried by a person or a machine.

Self-Localization is a crucial task for instance for mobile robots safe and autonomous navigation in their environment. It consists in learning the most probable pose (position and heading) of the mobile robot in a known map, taking into account noisy measurements provided by exteroceptive sensors such as lasers, sonars, radars and vision sensors and/or motion sensors such as motor encoders, inertial measurement units and global positioning systems.

The literature splits self-localization in two main sub-categories: position tracking (also called re-localization) and Global Localization.

Position tracking assumes that the robot initial pose is known with certainty and represented by a Dirac Delta distribution. When the robot moves, an error coming from the noise in motion sensors is added to the previous pose distribution. Position tracking aims to reduce this error by integrating observations received from exteroceptive sensors and matching them to a partially or totally known map.

Global Localization considers that the robot initial pose is unknown, and usually represented by a uniform distribution over the entire space. Then, the robot current pose is estimated, given the map and exteroceptive measurements. This problem is considered harder than the re-localization one since the space enclosing the possible solutions and the error are much larger.

Global Localization is an active research topic since the 1990s because it faces huge challenges, e.g., the high computational cost when solving this problem and the degree of robustness of the estimated pose when occlusions and/or noisy observations occur. Among these studies, grid-based localization methods seem to be among the most effective in terms of robustness and ability to deal with any kind of sensor uncertainty. Unfortunately, as it will be explained below, they suffer from an exponential complexity in terms of the grid size, which has limited their use.

Grid-based localization estimators compute and update the robot pose distribution represented by a histogram filter over a grid decomposition of the pose space (Burgard et al., (1996)). They seem to be less used despite their robustness, ability to deal with occlusions and suitability to any kind of statistical distribution. In fact, they suffer from an intractable computational complexity that is exponential with the grid size, therefore limiting their use to small grids.

A brief review of the standard grid-based Global Localization techniques found in the literature, initially introduced by Burgard et al. (1996), will now be discussed.

Let G be a given 2-Dimensional (but generalization to different dimensionality is straightforward) occupancy grid representing a map of the environment. G is composed of disjoint cells, each being in either of two possible states: "occupied" and "empty". A cell in an "occupied" state is a cell containing an obstacle, while a cell in an "empty" state contains no obstacle. More generally, each cell of the grid G may have a probability of occupancy in [0, 1] reflecting its likelihood of being in its "occupied" state (Elfes, 1989). In this case, at least some embodiments of the invention do not exploit all the information encoded by the occupancy probability, and merely consider a cell as "occupied" if its occupancy probability exceeds a threshold (typically 0.5) and "empty" otherwise.

Figure 1:
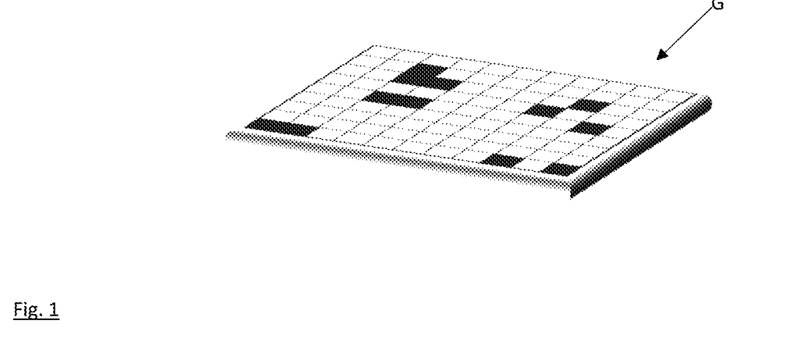
FIG. 1, already described, represents an occupancy grid modeling the environment.

In the following, it will be assumed that G is a square grid composed of N square-shape cells, each having a binary occupancy state ("occupied" or "empty"). An exemplary representation of G is provided on FIG. 1, where occupied cells are black and empty ones white.

Figure 2:
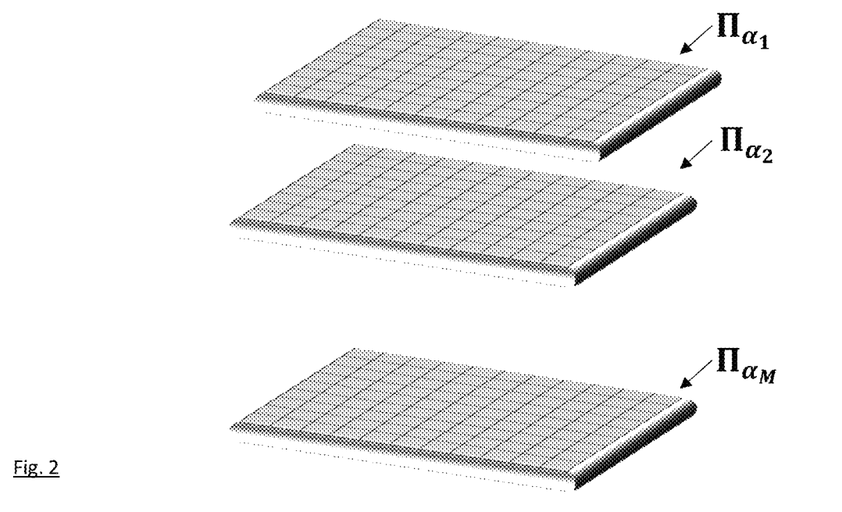
FIG. 2, already described, represents a set of position grids corresponding to different headings of a mobile body.

Let $A=\{\alpha_1, \ldots, \alpha_M\}$ for $M \in \mathbb{N}^*$ be the set of discretized possible values of the robot heading. For each $\alpha \in A$, let $\Pi_\alpha$ be a position occupancy grid—or, for short, a position grid—having the same shape and number of cells as G (see FIG. 2). Each $\Pi_\alpha$, $\alpha \in A$, represents the 2D space where the robot position distribution takes place; therefore, each cell of each position grid $\Pi_\alpha$ has a probability in [0, 1] reflecting the likelihood that the robot takes the pose—position and heading—represented by the cell. In the case of Global Localization, the initial pose distribution is typically set to a uniform distribution over $\Pi_\alpha$ $\forall \alpha \in A$.

Let $z^t = \{z_1, \ldots, z_{t-1}, z_t\}$ be a vector of t consecutive sensor readings acquired from an exteroceptive range sensor, i.e., a time series of range or distance measurements. Measurement z is defined as:

$$z = (r(z), \theta(z)) \quad (1)$$

where r(z) is the range from the sensor to the detected obstacle and $\theta(z)$ is the angle between the range sensor heading and the robot heading. The grid-based Global Localization problem, when the previous definitions apply, consists in finding the most likely $\alpha \in A$ and $x \in \Pi_\alpha$ by integrating $z^t$. In other terms, it consists in computing $x^*$, $\alpha^*$ with:

$$(x^*, \alpha^*) = \mathrm{argmax}_{\alpha \in A, x \in \Pi_\alpha} P(x|z^t, G) \quad (2)$$

The solution of the grid-based Global Localization problem requires the computation of $P(x|z^t, G)$ in (2) $\forall \alpha \in A$ and $\forall x \in \Pi_\alpha$. From Bayes' rule and Markov assumption, it comes:

$$P(x|z^t, G) = \eta p(z^t|x, G) P(x|z^{t-1}, G) \quad (3)$$

where $\eta$ normalizes the sum of the pose probabilities over all x up to 1, and $P(x|z^{t-1}, G)$ is the prior probability of position x. The term $p(z^t|x, G)$ is the so-called sensor model, specific to each sensor (e.g., its field of view, uncertainty). It is usually given (modeled) in advance. Its computation is based on the total probability law. First, let $\alpha_z = \alpha + \theta(z)$ be the angle that the principal axis of the sensor forms with the x-axis when the robot is at pose (x, $\alpha$) and let $\theta(z)$ be the sensor heading is with respect to the robot heading given by $\alpha$. Let $G_{x,\alpha z}$ be the part of G located in the sensor field-of-view when the sensor is located at x and its principal axis has an angle $\alpha_z$ with the x-axis, and $\phi(G_{x,\alpha z})$ the set of all the possible configurations of $G_{x,\alpha z}$ (i.e., all the possible combinations of cell states in $G_{x,\alpha z}$). Then, $p(z^t|x, G)$ is computed by summing over all the configuration grids in $\phi(G_{x,\alpha z})$:

$$p(z_t|x, G) = \Sigma_{\varepsilon \in \phi(G_{x,\alpha z})} p(z_t|x, \varepsilon) P(\varepsilon) \quad (4)$$

Solving the Global Localization problem requires updating the pose distribution over all $\Pi_\alpha$ $\forall \alpha \in A$. This is done by considering each position in $\Pi_\alpha$ $\forall \alpha \in A$, and computing $P(x|z^t, G)$ based on (3). Therefore, the update complexity is equal to M times the number of cells in each position grid $\Pi_\alpha$ times the complexity of the update in (4). The number of terms of the sum in (4) is equal to the number of elements of $\phi(G_{x,\alpha z})$, which in turn is an exponential function of the number $N_{x,\alpha z} \sim \sqrt{N}$ of cells in $G_{x,\alpha z}$. Therefore, the complexity of updating the pose probability distribution is exponential in terms of the size of the grid (of the order of $2^{\sqrt{N}}$), leading to an intractable computation.

To decrease this exponential complexity, Dia et al. (2017) proposed a linear sensor model for sensor having a narrow field-of-view based on the hypothesis of the nearest-target. Under the same hypothesis, Dia et al. (2018) and EP 3 594 719 proposed a linear sensor model for large field-of-view sensors. However, even with these solutions, the complexity of the pose distribution update remains quadratic in terms of the grid size because eq. (4) involves a sum over N terms, and has to be computed over all the cells of the pose grids. As a consequence, even in the narrow-field single-target approximation, grid-based Global Localization cannot, in practice, be computed for large grids (more than a few thousands cells).

SUMMARY OF THE INVENTION

The invention aims at overcoming these drawbacks of the prior art. More precisely, it aims at providing a grid-based Global Localization with reduced (linear) complexity, therefore suitable for use with large grids, as required by most practical application.

According to the invention, this aim is achieved by transforming the Global Localization problem into a mapping problem. More precisely, cells located on the border of the occupied regions in the environment grid are considered as "mapping sources". These sources use the observations received by exteroceptive sensors located on the robot to perform mapping into a set of position grids. Each position grid associated to a possible heading of the robot is composed of disjoints cells, each cell representing a possible position of the robot. The solution of the Global Localization problem is defined as the cell having the highest pose probability. A further advantage of this approach is that it is compatible with the use of integer arithmetic as introduced in (Rakotovao et al., 2016) and in WO2017/050890, leading to an implementation suitable for low computational power (e.g. embedded) devices.

An object of the present invention is then a method of localizing a mobile body in a known environment, the mobile body carrying at least one distance sensor, the method comprising the following steps, carried out by a data processor:

a) defining an occupancy grid modeling the environment, the grid comprising a plurality of cells, each cell of the occupancy grid being either in an 'occupied' state if it contains an obstacle or in an 'empty' state if it does not contains any obstacle;

b) defining a set of position grids, each position grid being associated to a heading of the mobile body and comprising a plurality of cells, a pose probability of the mobile body being associated to each cell of each position grid, a pose corresponding to the association of a position and a heading of the mobile body, the occupancy grid and the position grids being defined at least over a same region of space;

c) receiving a time series of measurements from the distance sensor, each of said measurements being representative of a distance between the sensor and a nearest obstacle on its line-of-view; and d) upon receiving a measurement of the time series, updating the pose probabilities of the position grids as a function of present values of said pose probabilities and of the received measurement;

the method further comprising:

a step a') of identifying, in the occupancy grid modeling the environment, cells in the 'occupied' states bordering at least one cell in the 'empty' state, said cells being called 'source' cells; and a step a") of defining, for every 'source' cell, a local occupancy grid comprising a plurality of cells, an occupancy probability being associated to each cell of the local occupancy grid;

wherein step d) comprises:

d1) for all or at least a subset of the 'source' cells, computing an occupancy probability of the cells of the corresponding local occupancy grid by applying an inverse sensor model to the measurement, while considering the distance sensor located in the 'source' cell;

d2) projecting the local occupancy grids onto a global occupancy grid and performing Bayesian fusion of the corresponding occupancy probability; and d3) updating the pose probabilities of the position grids by performing Bayesian fusion with the occupancy probabilities of the global occupancy grid.

Another object of the invention is an apparatus for localizing a mobile body in a known environment comprising:

at least one input port for receiving signals representative of a time series of distance measurements arising from at least one distance sensor;

a memory device for storing an occupancy grid modeling the environment, comprising a plurality of cells, each being either in an 'occupied' state if it contains an obstacle, or in an 'empty' state if it does not contain any obstacle, and a set of position grids, each position grid comprising a plurality of cells, each cell being associated to occupancy pose probability; and a data processor configured for receiving as inputs said signals and for using them for updating the occupancy probabilities of the position grids by applying such a method.

Yet another object of the invention is a mobile robot carrying such an apparatus.

BRIEF DESCRIPTION OF THE DRAWINGS

Additional features and advantages of the present invention will become apparent from the subsequent description, taken in conjunction with the accompanying drawings, wherein.

DETAILED DESCRIPTION

Figure 3:
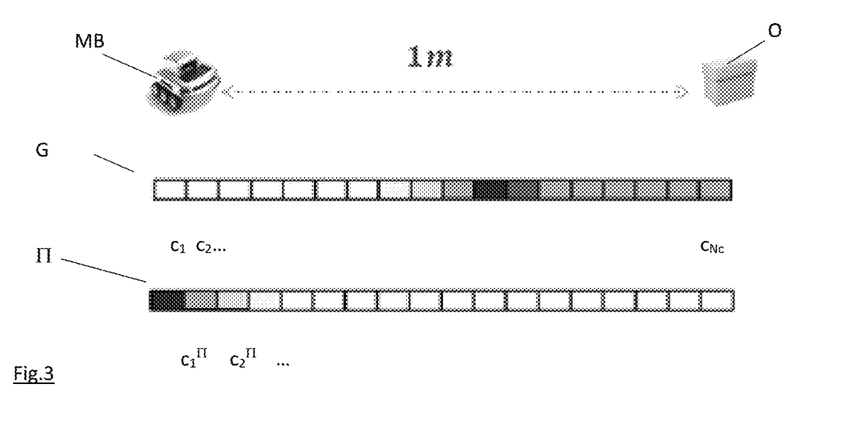
FIG. 3 illustrates a concept at the basis of the inventive method.

A main concept at the basis of the present invention is to treat grid-based global localization as a mapping problem. This is illustrated by FIG. 3. The mobile body MB is equipped with a distance sensor having a nearest-target behavior, i.e., that most likely detects the first obstacle in its field-of-view. It is also assumed that the sensor possesses a narrow field-of-view: it will detect a unique obstacle at a given distance in its field-of-view (for instance, as represented on the top part of FIG. 3, obstacle O situated at 1 m from the sensor). The field of view of the sensor can therefore be represented by a one-dimensional occupancy grid, as represented in the central part of FIG. 3, where darker cells $c_1, c_2 \ldots c_{Nc}$ have a higher occupancy probability, computed from a distance measurement (e.g. 1.1 m, given that the sensor measurement is noisy) using grid-based Bayesian mapping. Assuming that the environment (i.e. the position of obstacle O) is perfectly known, but the position of the mobile body is not, it is possible to take a reverse point-of-view and consider that obstacle O is the source of information and the mobile body the "obstacle" in front of the source. If the source (i.e. the obstacle) builds an occupancy map, the mobile body can use it to determine its most probable position. This occupancy grid Π, shown in the lower part of FIG. 3 will be called a "position grid", because the occupancy probability of its cells $c_1^\Pi, c_{2\Pi}, \ldots$ represents the probability that the mobile body is positioned in the cell. The position grid Π has the same geometry (same number of cells, corresponding to the same regions of the physical space) as the occupancy grid G modeling the environment, but its meaning is different. It can be shown that this approach reduces the computational complexity of the global mapping problem, which becomes linear in terms of the number of cells in the grid.

In fact, in the most general case, it will also be necessary to take into account the fact that the heading of the mobile system is unknown. It will then be necessary to define a plurality of (generally two- or three-dimensional) position grids $\Pi_{\alpha 1}, \Pi_{\alpha 2}, \ldots$, each associated to a specific heading value α belonging to a finite set A (i.e. only discrete heading values are allowed). The probability value associated to each cell of a position grid $\Pi_\alpha$ is called a "pose probability", a "pose" being the combination of a position and a heading value of the mobile body. Unlike in the pose grids known from the prior art, these probabilities are associated with a binary random variable representing the fact that each cell is occupied by the mobile body or not, instead of the robot pose distribution over all the grids $\Pi_\alpha$. They are defined independently over each cell.

In order to initialize the position grids, the pose probabilities of all cells are usually set to 0.5, representing complete uncertainty (a different choice is possible if there is some a priori knowledge of the mobile body pose).

In order to reduce the computational complexity of the localization method, only specific cells, called mapping sources, of the occupancy grid modeling the environment are used to match with the sensor observations. These mapping sources are split in real mapping sources and in virtual mapping sources.

A real mapping source, or source cell SC is a cell in G that is occupied (or its occupancy probability is greater than a threshold, typically 0.5) and possesses at least one empty neighbor cell (or a cell whose occupancy probability is smaller than a threshold, typically 0.5).

A virtual mapping source, or virtual source cell VSC is a cell outside and at the border of G that is the closest to a cell s*v verifying s*$_v$ is in G and at its border, s*$_v$ is empty (or its occupancy probability is smaller than a threshold, typically 0.5), and s*v is surrounded by at least one empty neighbor cell (or a cell whose occupancy probability is smaller than a threshold, typically 0.5).

A dead source DSC is a cell in G that is occupied (or its occupancy probability is greater than a threshold, typically 0.5) and is only surrounded by occupied cells.

Figure 4:
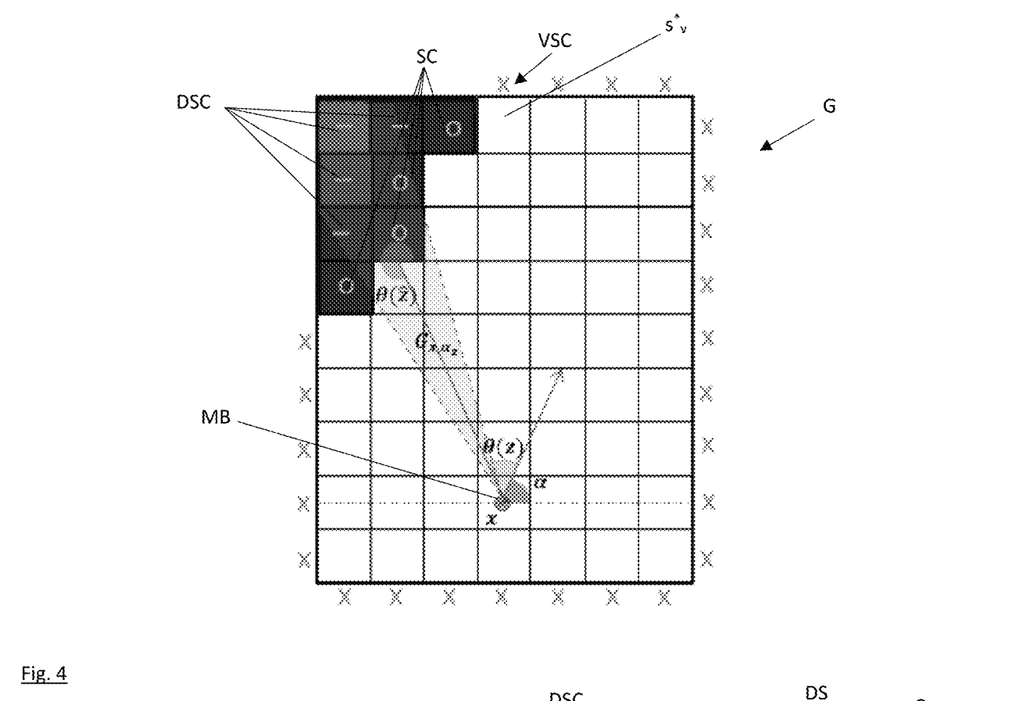
FIG. 4 illustrates the concepts of 'source' and 'virtual source' cells.

These concepts are illustrated on FIG. 4 (except the "dead source" concept which is illustrated on FIG. 5) where source cells are in dark gray and marked by a circle, dead source cells are in light gray and marked with a dash, virtual source cells are marked by a cross and non-source cells are white.

Figure 5:
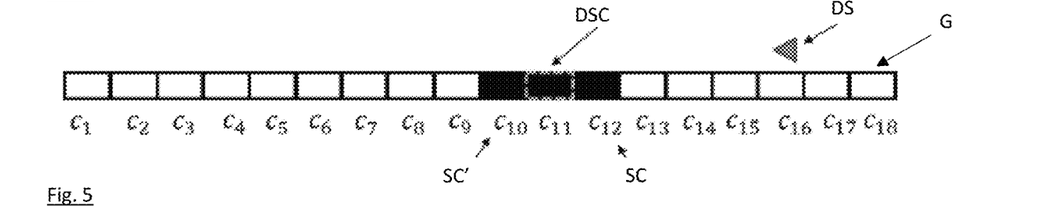
FIG. 5 illustrates the concept of 'inactive source cell'.

FIG. 5 shows a one-dimensional grid G with three occupied cells ($c_{10}, c_{11}, c_{12}$), one being a dead cell DSC, and fifteen empty cells ($c_1$-$c_9$ and $c_{13}$-$c_{18}$). A distance sensor DS equipping a mobile body is situated in cell $c_{16}$ and its field of view extends towards the left i.e. towards cells $c_1$-$c_{15}$. Position and heading, however, are supposed to be unknown. It can be seen that the occupied cell $c_{12}$ is an active mapping source SC; cell $c_{10}$ could be a mapping source if the distance sensor were situated in any one of cells $c_1$-$c_9$ with heading towards the right. Cell $c_{11}$, however, cannot serve as a mapping source because it is masked by $c_{10}$ and $c_{12}$: it is called a "dead source" DSC.

Let z be a measurement returned by the range sensor under the nearest-target hypothesis. A (real or virtual) mapping source is not necessarily used to update the pose probabilities. It is eligible to do so only if it is possibly at the origin of measurement z returned by the sensor and it is called in this case an active mapping source. Otherwise, it is called an offline mapping source (dead sources are always inactive). For instance, on FIG. 4, cell $c_{12}$ (denoted by reference SC) is active and cell $c_{10}$ (denoted by reference SC') is offline.

Figure 6A:
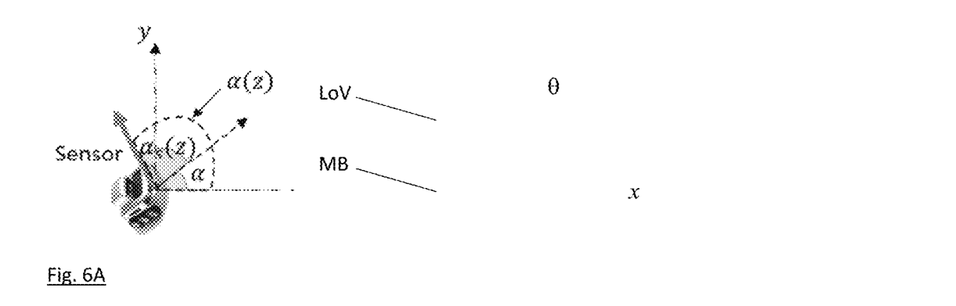
FIGS. 6A-6D represent the calculation of a "modified" distance measurement used for carrying out the invention.
Figure 6B:
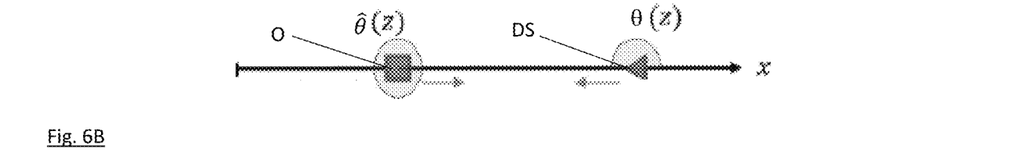
Figure 6C:
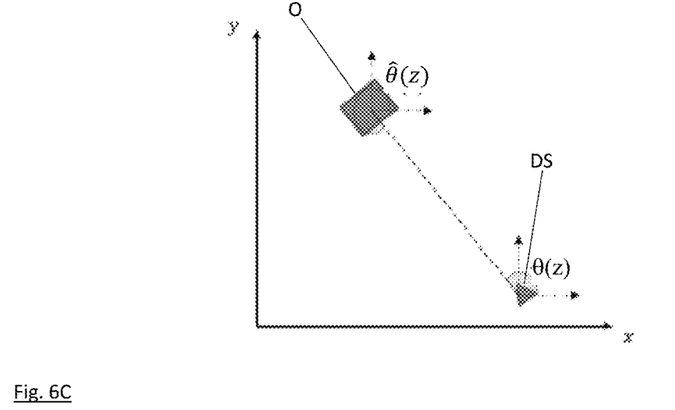

Deciding if the mapping source ĉ is active or offline depends on the angle with which the measurement ray, at the origin of the measurement, was sent by the sensor, i.e. the sensor's line-of-view (reference LoV on FIG. 6A).

Figure 6D:
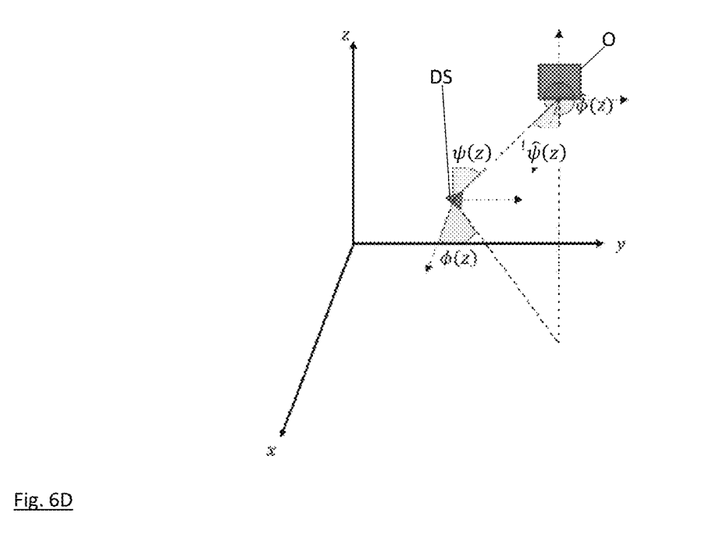

Consequently, to know whether a mapping source ĉ is active or not, the following method is applied:

1. Let θ(z) be the angle formed by the line-of-view LoV and a reference x axis.
2. Let θ̂(z) be the angle with which a ray emitted along the line-of-view is sent back by mapping source ĉ to the sensor. In a 1D or 2D case, θ̂(z)=θ(z)+180°. In a 3D case, instead of a single angle θ(z) it is necessary to consider inclination ϕ(z) and azimuth ψ(z) angles, and similarly α̂(z) is replaced by a pair of angles ϕ̂(z)=ϕ(z)+180° and ψ̂(z)=ψ(z)−180° (see FIG. 6D).
3. A ray is issued from ĉ with an angle of θ̂(z) (or with inclination ϕ̂(z) and azimuth ψ̂(z) in 3D). If the first cell intersecting this ray is empty, then, the mapping source ĉ is active. Otherwise, it is offline.

Angle θ̂(z) depends on both the heading of the mobile body MB, denoted by α, and the angle that the sensor line-of-view LoV makes with a reference axis of the mobile body (e.g. identifying its "forward" direction), denoted by $α_s(z)$. As shown on FIG. 6A, θ(z)=α+$α_s$(z).

The problem, however, is that, in Global Localization, α(z) is usually unknown. This is the reason why it is necessary to use a plurality of position grids $Π_α$, each corresponding to a different heading angle α∈A={$α_1$, . . . , $α_M$}—see FIG. 2. For a given distance measurement, each of these position grids will be associated to a different set of active (real and virtual) mapping sources.

Once the robot receives a measurement z—identified, as discussed above, by a distance value r(z) and an angle θ (z), each active mapping source updates the pose probability of every position grid $Π_α$ by mapping through it a transformed measurement ẑ where, in 2D (see FIG. 4):

$$r(ẑ)=r(z) \quad (4)$$

$$θ(ẑ)=θ(z)+α+180°. \quad (5)$$

Generalization to the 3D case is straightforward.

Figure 7:
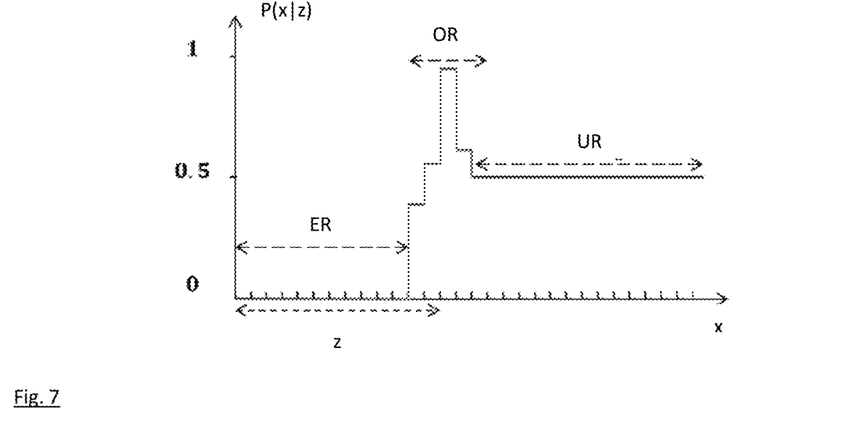
FIG. 7 is a plot of an exemplary inverse sensor model with narrow field of view and nearest-target behavior.

The pose probability update of every cell x∈$Π_α$ carried out by a real or virtual mapping source S, based on ẑ, is denoted by $P_s$(x|ẑ). It is important to note that only the pose probability of cells located in the ray issued from S with an angle of θ(ẑ) are updated, the raycast ending at the first mapping source or dead source crossed from S. $P_s$(x|ẑ) is computed using the so-called inverse sensor model that depends on the type of mapping source:

For a real mapping source SC, the inverse sensor model in x is defined based on Bayes's rule:

$$P_s(x|ẑ) = \frac{p_s(ẑ|X)P(x)}{p(ẑ)} \quad (6)$$

where $p_s$(ẑ|x) is the sensor model evaluated in x (SC is fixed and known), P(x) is the prior probability of x being occupied by the mobile body, and p(ẑ) is the probability of getting measurement ẑ. Since the inverse sensor model depends only on the distance between x, SC and the cell size (Dia et al., 2017), it can be stored in a lookup table. The usual shape of an inverse model is given on FIG. 7. It can be distinguished an "empty region" ER where the occupancy probability is zero, an "occupied region" OR which is suitable to be occupied by a nearest obstacle and an "unknown region" comprising cells masked by the nearest obstacle and for which the occupancy probability is 0.5 (complete uncertainty). As disclosed by Rakotovao et al. (2016), only the values related to occupied regions (i.e. above 0.5) need to be stored in the lookup table.

For a virtual mapping source VSC, two cases must be considered:
if r(ẑ) is different from the range returned by the sensor when there is no obstacle in front of the robot, then $P_s$(x|ẑ) is updated to 0 (the cell is certain to be empty); otherwise, $P_s$(x|ẑ) is kept equal to the prior value of P(x).

Let $z^t$={$z_1$, . . . $z_t$} be t consecutive measurements returned by a range sensor under the nearest-target behavior. The update of the position grids by active mapping sources is carried out in three steps. First, each measurement in $z^t$ is processed separately by every active mapping source in order to create so-called mono-measurement mono-source position grids. Then, all the mono-measurement mono-source position grids corresponding to a same measurement are fused in order to create so-called mono-measurement multi-source position grids. Finally, the mono-measurement multi-source position grids corresponding to all the active mapping sources are fused for all the measurements to create the so-called multi-measurement multi-source position grids. These steps are repeated for all the possible heading values α∈A.

Figure 8:
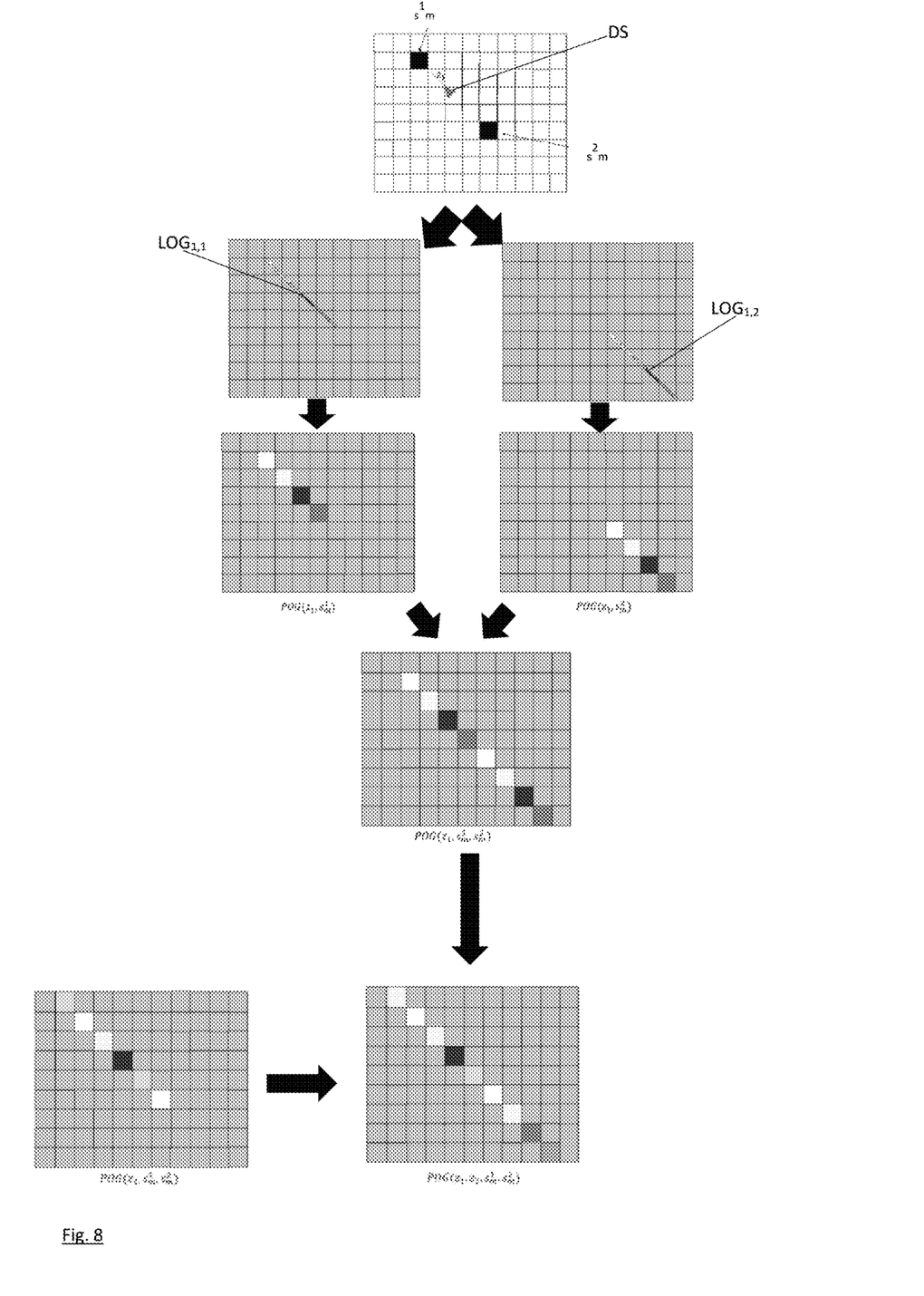
FIG. 8 illustrates the updating of position grids occupancy probabilities according to an embodiment of the invention.

This process is illustrated on FIG. 8 for a simple situation where there are only two mapping sources $s^1_m$, $s^2_m$ (first line of the figure).

Let $z_i$ be one measurement in $z^t$, issued with an angle of θ($z_i$) from the sensor. Let $s^k_m$, k=1 . . . J be all the active mapping sources. The mono-measurement mono-source position grid computed from $s^j_m$ and $z_i$ is designated by POG($z_i$, $s^j_m$)—for the time being, a single heading angle α is considered, and ignored in the notation. In order to compute POG($z_i$, $s^j_m$):

First, the inverse sensor model is computed from measurement $z_i$ in a one-dimensional local grid $LOG_{i,j}$ to $s^j_m$. This local grid issued from $s^j_m$ makes an angle θ(ẑ) with the x-axis. It should be noted that if the local grid contains another mapping source $s^i_m$ (active or offline), only the cells having a range smaller than the range of $s^i_m$ will be updated because, since the nearest-target hypothesis holds, it is not possible for the mobile to be located after $s^i_m$. If it was the case, then the robot would have seen $s^i_m$ instead of $s^j_m$ (second line of the figure).

Second, a range mapping is applied in order to find the cells in the global grid that intersect with the local grid. Their probability of pose occupancy is inherited from the cells with which they intersect in the local grid (third line of the figure). When a cell of the global grid only intersects a single cell of a local grid, then it takes the probability of the latter. When a cell of the global grid intersects several cells of the local grid, there are several possible ways of defining "inheritance", corresponding to different embodiments of the invention. For instance, the cell of the global grid may take the probability of the cell of the local grid whose center is the closest to its center. Another possibility is to attribute to the cell of the global grid the probability value of the cell of the local grid with which it has the largest overlap. Yet another possibility is to attribute to the cell of the global grid a probability value corresponding to a weighted average of the probability values of the intersecting local grid cells, the weights being an increasing function of the overlap or a decreasing function of the center distance, etc.

A mono-measurement multi-source position grid $POG(z_i, s^1_m \ldots s^J_m)$—$POG(z_1, s^1_m, s^2_m)$ on the fourth line of FIG. 8—is then computed by performing Bayesian fusion of all the mono-measurement mono-source position grids.

Finally, Bayesian fusion of mono-measurement multi-source position grids corresponding to different measurements—$POG(z_1, s^1_m, s^2_m)$ and $POG(z_1, s^1_m, s^2_m)$ on the bottom line of FIG. 8—is performed to compute a mono-measurement multi-source position grid $POG(z_i \ldots z_i, s^1_m \ldots s^J_m)$—$POG(z_1, z_2, s^1_m, s^2_m)$ on the figure.

The concept of Bayesian fusion is discussed e.g. in (Rakotovao et al. 2016). Let $\hat{z}_1$ and $\hat{z}_2$ two range measurements and $P_1 = P_s(x|\hat{z}_1)$ and $P_2 = P_s(x|\hat{z}_2)$—the conditional probabilities being defined by equation (6). Then:

$$P_s(x \mid \hat{z}_1, \hat{z}_2) = F(P_1, P_2) = \frac{P_1 \cdot P_2}{P_1 \cdot P_2 + (1 - P_1) \cdot (1 - P_2)} \quad (7)$$

Performing Bayesian fusion by directly applying equation 7 would require a significant number of floating point operation, which are computationally heavy, especially for embedded processors. (Rakotovao et al. 2016) and WO2017/050890 has disclosed a method for replacing floating point operations with integer operations, thus drastically simplifying the computations required when performing Bayesian fusion. The basic ideas is that, albeit in principle $P_1$ and $P_2$ can take any real value in the [0, 1] interval, computation can be performed on discrete values, and therefore these probability values must be discretized. Otherwise stated, a probability on the interval [0; 1] has to be represented in a discretized manner, by way of probability classes identified by integer indices. A countable subset of [0; 1], whose elements $p_n$ can be characterized by a relative integer index "n", will be called a "system of probability classes" $S = \{p_n, n \in \mathbb{Z}\}$. Some systems of probability classes have the property that the fusion of two probability classes of the system also belongs to the system; formally: $\forall p_i, p_j \in S$, $F(p_1, p_2) \in S$.

One then speaks of an "error-free" system of classes, since the fusion does not introduce any error or approximation. It is therefore possible to label the probability values by the indices of the corresponding classes, and the result of a fusion is also identified by an index. The fusion problem then amounts to determining an appropriate function $F_d$ which, with two integer indices, associates another integer index. Floating point operations on probability values are thus replaced by integer operations on indexes.

An advantageous quantification scheme is based on a countable set $S_k$ of probability values given by the union of the following subsets:

$$S_k^- = \left\{ \frac{1}{2 - k \cdot n}, n \leq 0 \right\} \quad (7a)$$

$$S_k^+ = \left\{ \frac{k \cdot n + 1}{k \cdot n + 2}, n \geq 0 \right\} \quad (7b)$$

where k is a positive integer ($k \in \mathbb{N}^*$). $S_k$ quantizes the interval [0, 1] in a non-uniform manner, with a quantization spacing which is large near the value 0.5 and smaller and smaller on approaching the values 0 and 1. This is doubly advantageous, since:

a probability of 0.5 indicates uncertain occupancy; it is therefore not useful to be very precise around this value; on the other hand, precision is useful in proximity to the extreme values 0 and 1, that mean "emptiness" and "occupancy" respectively;

beyond a certain value of |n|, the discrete probability values get extremely close together; the error introduced by truncating the set is therefore negligible.

Another family of probability quantification scheme is defined by recursion:

$$p_0 = 0.5; \quad (7c)$$
$$p_1 = p;$$
$$p_2 = F(p, p);$$
$$p_3 = F(p_2, p);$$
$$\ldots$$
$$p_{n+1} = F(p_n, p)$$
$$p_{-1} = 1 - p;$$
$$p_{-2} = F(p_{-1}, p_{-1});$$
$$p_{-3} = F(p_{-2}, p_{-1});$$
$$\ldots$$
$$p_{n-1} = F(p_n, p_{-1})$$

where "p" is a parameter satisfying $0.5 < p < 1$ and $$F(p_i, p_j) = \frac{p_i p_j}{p_i p_j + (1 - p_i)(1 - p_j)} \quad (8)$$

Converting a Global Localization problem to a mapping one, which is an idea at the heart of the invention, drastically reduces its computational complexity. As an example, consider the simple 1D environment of FIG. 3. Suppose that we use a Global Localization technique according to the prior art to estimate the absolute pose of a mobile body (e.g. (Burgard et al., (1996)): each cell of a position grid is dealt with separately to update its probability. This is done by casting a ray from each cell till detecting the obstacle. The ray produced by cell $c_1$ crosses 10 cells, the one produced by $c_2$, 9 cells, and so on. If $N_{cells}$ is the number of cells in the position grid, the update complexity is $N_{cells}(N_{cells}+1)/2$, which is quadratic with respect to $N_{cells}$. Instead, when applying a method according to the invention, the raycast is performed only once. The obtained ray crosses, at most, $N_{cells}$ cells, i.e. the size of the considered grid. The complexity is therefore linear with respect to the size of the position grid, instead of being quadratic. The computational load may be further reduced by performing "integer Bayesian fusion", as explained above.

Figure 9:
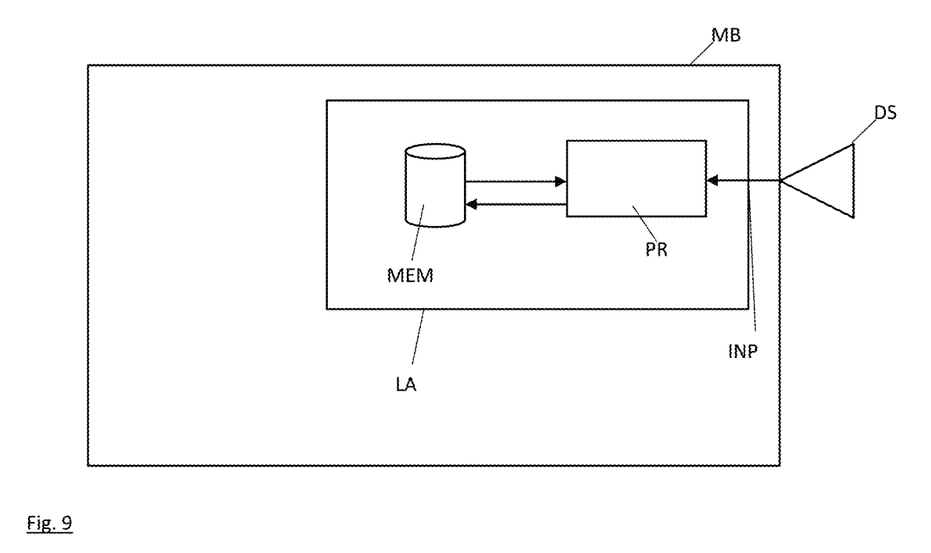
FIG. 9 is a block diagram of an apparatus according to an embodiment of the invention.

FIG. 9 is a schematic representation of a mobile body MB, e.g. a robot, equipped with a localization apparatus LA and a distance sensor DS. The localization apparatus comprises a suitably-programmed processor PR (or a suitably-configured custom or semi-custom digital circuit, or a suitably-programmed programmable digital circuit such as a FPGA) and a memory device MEM. The memory device MEM stores an occupancy grid modeling the environment and a set of position grids, each associated to a possible heading of the mobile body. Processor PR receives range measurements from the distance sensor DS through an input ports INP and uses them for updating the occupancy probabilities of the position grids by applying a method as described above.

REFERENCES (Burgard et al. 1996): Burgard, W., Fox, D., Hennig, D. and Schmidt, T. (1996). Estimating the absolute position of a mobile robot using position probability grids, National Conference on Artificial Intelligence, pp. 896-901.
(Elfes, 1989): Elfes, A. (1989). Using occupancy grids for mobile robot perception and navigation, Computer 22(6): 46-57.
(Dia et al. 2017): Dia, R., Mottin, J., Rakotovao, T., Puschini, D. and Lesecq, S. (2017). Evaluation of occupancy grid resolution through a novel approach for inverse sensor modeling, IFAC World Congress, Toulouse, France.
(Dia et al. 2018): Dia, R., Lesecq, S., Mottin, J. and Puschini, D. (2018). General inverse sensor model for probabilistic occupancy grid maps using multi-target sensors, Int. Symposium on Mathematical Theory of Networks and Systems
(Rakotovao et al. 2016): Rakotovao, T., Mottin, J., Puschini, D. and Laugier, C. (2016). Multi-sensor fusion of occupancy grids based on integer arithmetic, IEEE Int. Conf. on Robotics and Automation.

The invention claimed is:

1. A method of localizing a mobile body (MB) in a known environment, the mobile body carrying at least one distance sensor (DS), the method comprising the following steps, carried out by a data processor:
   a) defining an occupancy grid (G) modeling the environment, the grid comprising a plurality of cells, each cell of the occupancy grid being either in an 'occupied' state if it contains an obstacle or in an 'empty' state if it does not contains any obstacle;
   b) defining a set of position grids ($\Pi_{\alpha 1}$, $\Pi_{\alpha 2}$, ... ), each position grid being associated to a heading ($\alpha$) of the mobile body and comprising a plurality of cells ($C_1^{\Pi}$, $C_2^{\Pi}$, ... ), a pose probability of the mobile body being associated to each cell of each position grid, a pose corresponding to the association of a position and a heading of the mobile body, the occupancy grid and the position grids being defined at least over a same region of space;
   c) receiving a time series of measurements ($z_1$, $z_2$, ... ) from the distance sensor, each of said measurements being representative of a distance between the sensor and a nearest obstacle (O) on its line-of-view (LoV); and
   d) upon receiving a measurement of the time series, updating the pose probabilities of the position grids as a function of present values of said pose probabilities and of the received measurement;
   the method further comprising:
   a step a') of identifying, in the occupancy grid (G) modeling the environment, cells (SC) in the 'occupied' states bordering at least one cell in the 'empty' state, said cells being called 'source' cells; and
   a step a") of defining, for every 'source' cell, a local occupancy grid ($LOG_1$, $LOG_2$ ... ) comprising a plurality of cells, an occupancy probability being associated to each cell of the local occupancy grid;
   wherein step d) comprises:
   d1) for all or at least a subset of the 'source' cells, computing an occupancy probability of the cells of the corresponding local occupancy grid by applying an inverse sensor model to the measurement, while considering the distance sensor located in the 'source' cell;
   d2) projecting the local occupancy grids onto a global occupancy grid and performing Bayesian fusion of the corresponding occupancy probability; and
   d3) updating the pose probabilities of the position grids by performing Bayesian fusion with the occupancy probabilities of the global occupancy grid.

2. The method of claim 1, further comprising
   a step a''') of supplementing the occupancy grid (G) modeling the environment with cells directly outside its border and identifying those of said cells neighboring at least one cell on the border of the occupancy grid and being in the 'empty' state, the identified cells being called 'virtual source' cells (VSC), and defining a local occupancy grid for every 'virtual source' cell;
   wherein step d) further comprises:
   d1') for at least a subset of the 'virtual source' cells, setting the occupancy probability of the cells of the corresponding local occupancy grid to zero if the measurement value is not a maximum or out-of-range value.

3. The method of claim 1, wherein, in step d), 'source' cells (SC') which, based on available information on the orientation of the line-of-view of the sensor, are known to be shadowed by other cells in the 'occupied' state, are not used for updating the pose probabilities of the position grids.

4. The method of claim 1, wherein, in step d1), the occupancy probability $P_s(x|\hat{z})$ of a cell x of the local occupancy grid corresponding to a 'source' cell is computed as:

$$P_s(x \mid \hat{z}) = \frac{p_s(\hat{z} \mid x) P(x)}{p(\hat{z})}$$

where '$\hat{z}$' is a transformed measurement value, corresponding to the measured scalar distance and an orientation opposite to that of the line-of-view of the sensor, '$p(\hat{z})$' an a priori probability distribution for '$\hat{z}$', $p_s(\hat{z}|x)$ a sensor model and P(x) a prior position probability of the mobile body being located in cell x.

5. The method of claim 1, wherein each said inverse sensor model is a discrete model associating to each cell, and each distance measurement, a probability class chosen from a set of finite cardinality, each said probability class being identified by an integer index; and in that, in step d3), Bayesian fusion of the occupancy probabilities is performed by means of integer computations performed on the indices of said probability classes.

6. The method of claim 5, wherein said set of finite cardinality of probability classes is formed by the union of one or more subsets such that, during said step c), the fusion of two probability classes belonging to one and the same subset provides a result also belonging to said subset.

7. The method of claim 6, wherein said set of finite cardinality of probability classes, designated by $G_p$, is formed by the union of two subsets $G_p^-$ and $G_p^+$ defined by:

$$G_p^- = \{(p_n), n \leq 0\}$$

$$G_p^+ = \{(p_n), n \geq 0\}$$

the index n taking relative integer values, p being a parameter of value lying strictly between 0.5 and 1 and the probability class $p_n$ being defined by recursion as follows:

$$p_0 = 0.5;$$

$$p_1 = p;$$

$$p_{n+1} = F(p_n, p) \; \forall \, n > 1$$

$$p_{-1} = 1 - p;$$

$$p_{n-1} = F(p_n, p_{-1}) \; \forall \, n < -1$$

with $F(P, P') = \dfrac{P \cdot P'}{P \cdot P' + (1-P)(1-P')}$ wherein, during said step d3), the fusion $F(p_i, p_j)$ between two probability classes $p_i, p_j \in G_p$ is computed by:

$$F(p_i, p_j) = p_{i+j}$$

8. An apparatus (LA) for localizing a mobile body (MB) in a known environment comprising:
   at least one input port (INP) for receiving signals representative of a time series of distance measurements ($z_1$, $z_2$) arising from at least one distance sensor (DS);
   a memory (MEM) device for storing an occupancy grid modeling the environment, comprising a plurality of cells, each being either in an 'occupied' state if it contains an obstacle, or in an 'empty' state if it does not contains any obstacle, and a set of position grids, each position grid comprising a plurality of cells, each cell being associated to occupancy pose probability; and
   a data processor (PR) configured for receiving as inputs said signals and for using them for updating the occupancy probabilities of the position grids by applying a method as claimed in claim 1.

9. The apparatus of claim 8, also comprising at least one distance sensor (DS) adapted for generating signals representative of a distance between the sensor itself and a nearest obstacle on a line-of-view, and for providing them to said input port.

10. A mobile robot (MB) carrying an apparatus (LA) according to claim 9.

* * * * *